United States Patent [19]

Hourtane et al.

[11] Patent Number: 4,689,713
[45] Date of Patent: Aug. 25, 1987

[54] HIGH VOLTAGE SURGE PROTECTION FOR ELECTRICAL POWER LINE

[75] Inventors: Jean-Luc Hourtane, Mery sur Oise; Christian Girard, Argenteuil, both of France

[73] Assignee: Les Cables de Lyon, Cedex, France

[21] Appl. No.: 872,999

[22] Filed: Jun. 11, 1986

[30] Foreign Application Priority Data

Jun. 12, 1985 [FR] France ................ 85 08903

[51] Int. Cl.⁴ .............................. H02H 3/22
[52] U.S. Cl. ...................... 361/118; 361/111
[58] Field of Search .......... 361/54, 56, 113, 111, 361/117–119

[56] References Cited

U.S. PATENT DOCUMENTS

| | | | |
|---|---|---|---|
| 3,173,029 | 3/1965 | Nadolsky | 307/93 |
| 3,793,535 | 2/1974 | Chowdhuri | 361/111 |
| 3,876,922 | 4/1975 | Forstbauer | 361/111 X |
| 3,934,175 | 1/1976 | Clark | 361/118 X |
| 4,156,838 | 5/1979 | Montague | 361/118 X |
| 4,174,530 | 11/1979 | Kresge et al. | 361/120 X |
| 4,228,478 | 10/1980 | Jabszt et al. | 361/117 X |
| 4,437,134 | 3/1984 | Dupraz | 361/56 |
| 4,571,656 | 2/1986 | Ruckman | 361/56 |

FOREIGN PATENT DOCUMENTS

| | | | |
|---|---|---|---|
| 1638061 | 1/1968 | Fed. Rep. of Germany. | |
| 517103 | 5/1978 | U.S.S.R. | 361/54 |

Primary Examiner—A. D. Pellinen
Assistant Examiner—A. Jonathan Wysocki
Attorney, Agent, or Firm—Sughrue, Mion, Zinn, Macpeak & Seas

[57] ABSTRACT

A surge protection device comprising an inductor and a limiting bridge stage (10) with two oppositely biased power diodes (15,16) each connected in series with a high-valued capacitor, features an inductor connected in a first stage including a spark-gap (6) to ensure decoupling by the inductor from the second limiting bridge stage. A time-delay relay (10A) is disposed at the terminals of each power diode/capacitor combination to enable charging of the capacitors through a resistor (20) and auxiliary diodes (21, 22) connected between the relay and the power line on the one hand and between the power diode and the capacitor on the other hand, and the subsequent blocking of the bridge once the capacitors have been charged.

5 Claims, 1 Drawing Figure

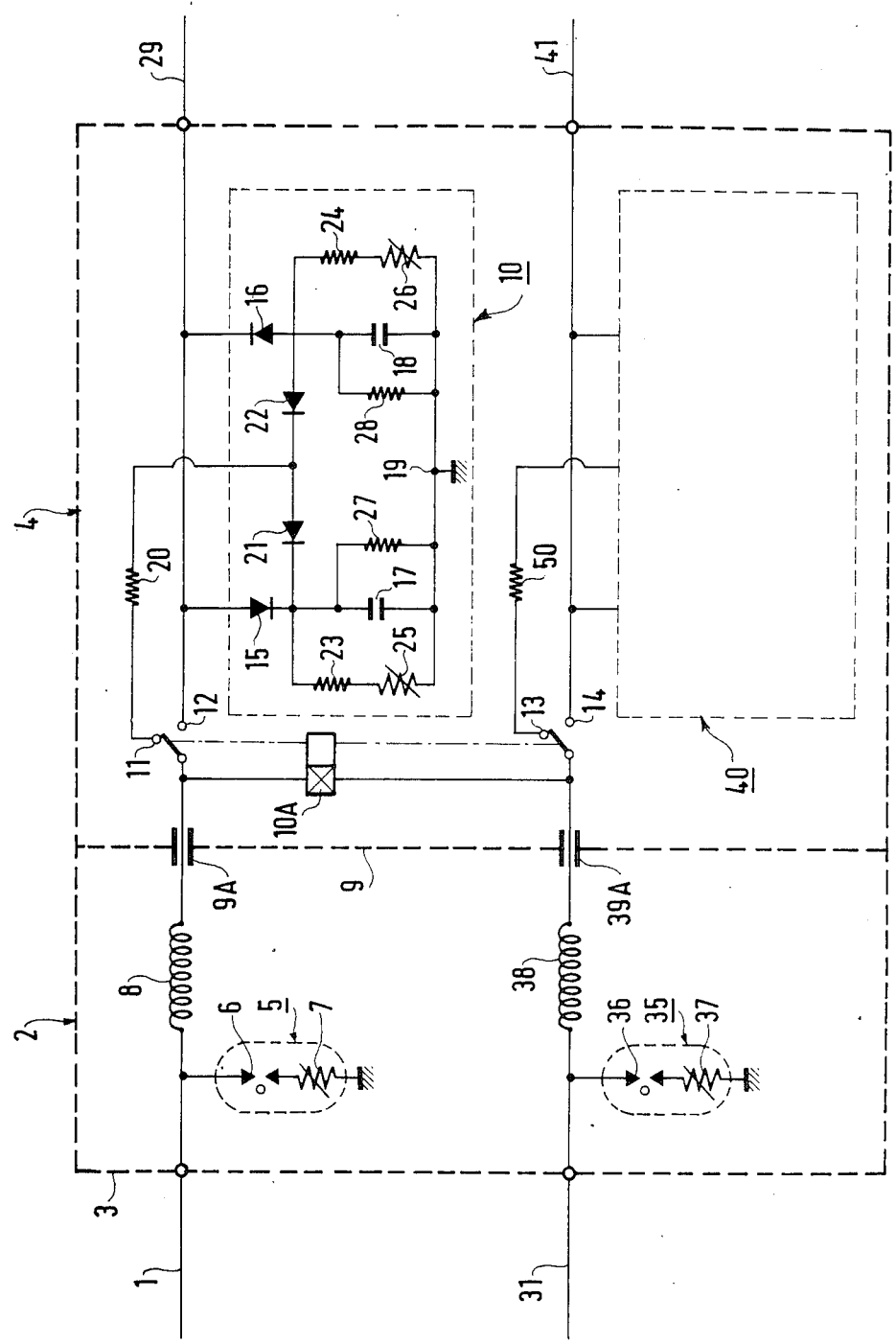

HIGH VOLTAGE SURGE PROTECTION FOR ELECTRICAL POWER LINE

FIELD OF THE INVENTION

This invention relates to a device for protecting an AC electrical power line against electromagnetically-induced, high transient overvoltages or surges, said device comprising an inductor and a peak limiting bridge stage made up of two opposite polarity power diodes each series-connected to a high-valued capacitor.

BACKGROUND OF THE INVENTION

The document DE-A-1638061 describes an overvoltage protector for an AC power line, having on each conductor an inductor, and shuntconnected between the two conductors for each half-wave a high-valued capacitor in series with a diode and a resistor connected across the capacitor terminals for its discharging. This device however does not provide sufficient protection against steep wavefront, high voltage electromagnetic impulses.

It is the object of the invention to provide a more efficient, yet simple, protective device against voltage surges and especially surges caused by lightning.

SUMMARY OF THE INVENTION

The protective device according to the invention features an inductor connected in a first stage comprising a spark-gap to ensure its decoupling from the limiting bridge stage, and a time-delay disposed at the terminals of each power diode/capacitor combination to enable charging of the capacitors through a resistor and series diodes connected between the relay and the power line on the one hand and between the power diode and the capacitor on the other hand, and the subsequent blocking of the bridge once the capacitors have been charged.

It further preferably includes at least one of the following features:
- the first stage spark-gap is series-connected with a varistor connected to ground;
- a resistor and a varistor are additionally connected in series across the terminals of each of the capacitors to enable the capacitors' charge to be returned to the initial value of the network after clipping the transient overvoltage;
- the first stage inductor is a non-saturable, wound aluminum sheet design;
- and the capacitance of the capacitors in series with the power diodes is about 2000 microfarads, for lightning surge protection purposes.

A device according to the invention for protecting an electrical power line nominally carrying 220 or 380 volts, single phase AC, and a continuous current of between 25 and 700 amperes, against all types of electromagnetic disturbances will now be described by way of example, with reference to the single figure of the appended drawing.

BRIEF DESCRIPTION OF THE FIGURE

The single FIGURE is an electrical schematic diagram of a preferred embodiment of the present invention.

DESCRIPTION OF THE PREFERRED EMBODIMENT

The device is described essentially in relation to the path of a phase conductor, but actually comprises the same circuit components on the second conductor, which will therefore be mentioned only briefly.

The conductor 1 penetrates into a first stage 2 disposed in a steel shielding casing 3 which also encloses the second stage 4. Said first stage comprises a power lightning arrester 5 consisting of a spark-gap 6 and a series-connected varistor 7 connected to ground, said varistor serving to limit the current diverted by the lightning arrester.

The first stage also includes an inductor 8 for decoupling with respect to stage two 4. This inductor is a non-saturable, wound aluminum sheet design and is accordingly much less bulky than a conventional inductor.

The first stage is intended to absorb 60 to 80% of the energy in the incident wave by clipping its voltage at about 4000 V, and to block the high frequency components.

The first stage is connected to the second stage through a partition 9 with decoupling provided by a capacitor 9A having a value of the order of a microfarad. Said capacitor eliminates any high frequency energy as may still be present in the incident wave.

The second stage basically consists of a peak limiting bridge 10 made up of two oppositely biased power diodes 15, 16, each of said diodes being series-connected to a high-valued capacitor 17, 18, of about 2000 microfarads, whose other terminals are grounded at point 19.

The contact points between the power diodes and the capacitors are linked via two oppositely disposed auxiliary diodes 21, 22. To the terminals of each of the capacitors are connected in series a resistor and a varistor 23, 25 and 24, 26. A safety resistor 27, 28 connected across the terminals of each capacitor enables capacitor discharge in the event of a mains outage. Lastly, a time-delay relay 10A comprises a capacitor charging position (terminal 11), for charging through a resistor 20, and a rest position (terminal 12).

On leaving the second stage, the conductor 29 connects the device to the downstream apparatus to be protected.

The operation of this second stage is as follows:

In the steady state, at powering up, the time-delay switch closes the circuit passing through the resistor 20. On powering up, the capacitors 17, 18 are slowly charged by resistor 20 and series diodes 21, 22. The relay switch 10A switches the line (switching to terminal 12) after approximately one second.

This avoids too sudden an initial current demand due to the high values of the capacitors. The latter are then charged at the value of the network peak voltage, in both polarities. The diodes 21, 22 become blocking and the leakage current is thus very small.

In the transient state, when an overvoltage appears on the line it causes the power diodes 15, 16 to conduct and peak limits the overvoltage due to the low impedance of the capacitors in relation to the disturbance frequency.

For example, the overvoltage may be limited to about 100 volts downstream in the network (conductor 29) in the case of an 8×20 microsecond, 50,000-ampere lightning surge.

The resistor-varistor circuit across the terminals of the capacitors brings the capacitors' charge following the surge, back to the previous network value. Attention is drawn to the fact that the relay is selfprotected by the main device.

The second conductor 31, like the first, comprises a lightning arrester 35 (consisting of spark-gap 36 and varistor 37), an inductor 38, a first-to-second stage coupling capacitor 39A and an identical peaklimiting bridge, designated as a whole by the numeral 40. The second conductor is connected to the terminals 13, 14 of the relay and the capacitor-charging resistor 50 is connected to terminal 13. On leaving the second stage, the conductor 41 connects the protective device to downstream apparatus to be protected.

We claim:

1. A device for protecting an AC electrical power line against electromagnetically-induced, high transient overvoltages or surges, said device comprising: electrically connected first and second stages, said first stage comprising an inductor for decoupling said first stage from second stage, said second stage comprising a peak-limiting bridge, said peak-limiting bridge comprising two oppositely biased power diodes, each connected in series with a high-valued capacitor, said inductor in said first stage being connected to a ground via a spark gap to insure decoupling by said inductor of said first stage from said second stage, and a time-delay relay disposed at the terminals of each power diode/capacitor combination to enable charging of the capacitors through a resistor and auxiliary diodes connected between the relay and the power line one the one hand and between the power diode and the capacitor on the other hand, and to subsequently block the bridge once the capacitors have been charged.

2. Device according to claim 1, wherein said spark-gap of the first stage is series connected with a varistor connected to ground.

3. Device according to claim 1 or 2, further comprising resistors and varistors series-connected to the terminals of the capacitors to enable the capacitor charges to be taken back down to the initial network value after limiting the transient overvoltage.

4. Device according to claim 1, wherein said first stage inductor is made of non-saturable wound aluminum sheet.

5. Device according to claim 1 for protection against lightning surges, wherein the combined capacitance of the capacitors in series with the power diodes is approximately 2000 microfarads.

* * * * *